United States Patent [19]

Hepburn

[11] Patent Number: 4,946,090

[45] Date of Patent: Aug. 7, 1990

[54] SEALS BETWEEN CERAMIC ARTICLES OR BETWEEN CERAMIC ARTICLES AND METAL ARTICLES

[75] Inventor: William D. Hepburn, Edinburgh, Scotland

[73] Assignee: Ferranti International Signal, plc, Cheshire, England

[21] Appl. No.: 230,492

[22] Filed: Aug. 9, 1988

[30] Foreign Application Priority Data

Aug. 18, 1987 [GB] United Kingdom ................. 8719498

[51] Int. Cl.$^5$ ............................................... B23K 1/20
[52] U.S. Cl. ..................................... 228/121; 228/122; 228/124; 228/206; 228/209; 228/263.12
[58] Field of Search ............... 228/206, 208, 209, 245, 228/254, 116, 121, 122, 124, 263.12

[56] References Cited

U.S. PATENT DOCUMENTS

| | | | |
|---|---|---|---|
| 2,235,680 | 3/1941 | Haven et al. | 228/121 |
| 3,061,527 | 10/1962 | Karner et al. | 228/254 |
| 3,656,225 | 4/1972 | Bereza | 228/121 |
| 3,754,674 | 8/1973 | Wesoloski | 228/122 |
| 3,951,327 | 4/1976 | Snow et al. | 228/121 |
| 4,293,986 | 10/1981 | Kobayashi et al. | 228/121 |
| 4,328,921 | 5/1982 | Liang | 228/254 |
| 4,602,731 | 7/1986 | Dockus | 228/121 |

FOREIGN PATENT DOCUMENTS

| | | | |
|---|---|---|---|
| 100870 | 8/1980 | Japan | 228/206 |
| 917416 | 2/1963 | United Kingdom | 228/121 |

*Primary Examiner*—Richard K. Seidel
*Assistant Examiner*—Samuel M. Heinrich
*Attorney, Agent, or Firm*—Kerkam, Stowell, Kondracki & Clarke

[57] ABSTRACT

A seal between two ceramic articles, or between a ceramic article and a metal article, is formed by providing a sealing member comprising an aluminum body, and a film of zinc or tin being deposited threon, with the inevitable aluminum oxide surface film removed, and subsequently a coating of silver and/or gold, or a suitable alloy containing silver or gold, being provided. The sealing member is positioned between the articles, and the bonding operation comprises heating the assembly in an inert atmosphere, or in a high vacuum, to melt the composite sealing member, there being obviated the need to apply pressure during the bonding operation. Any oxide film on silver readily decomposes at a temperature of, at most, 250° C. No oxide film is formed on gold. The zinc or tin film, and the coating, are readily absorbed into the molten aluminum produced during the bonding operation. Subsequently, the bonded assembly is out-gassed at a temperature up to 600° C. A ceramic article may be of a glass ceramic, or of fused silica; and a metal article may be of a suitable nickel-iron alloy.

4 Claims, No Drawings

SEALS BETWEEN CERAMIC ARTICLES OR BETWEEN CERAMIC ARTICLES AND METAL ARTICLES

This invention relates to seals between two ceramic articles, or between a ceramic article and a metal article.

For example, the articles may be of a glass ceramic, or of fused silica, or of a nickel-iron alloy.

It is desirable that the seals should be formed at as high a temperature as possible, so that subsequent outgassing from the sealing region can be as efficient as possible, by being at a temperature near to the high sealing temperature. Further, the higher the sealing temperature the stronger may be the reaction between the sealing material and the articles to be bonded together, and, thus, the stronger may be the bond strength obtained. Ideally, the sealing is performed by employing the maximum temperature which can be withstood by the articles to be bonded together; which desirably is a temperature at least equal to that of the melting point of the sealing material.

It is also required, for a satisfactory bond to be formed, that the sealing material has substantially chemically clean, and, in particular, substantially oxide-free, surfaces in contact with the articles to be bonded. The provision of such surfaces on the sealing material is difficult to obtain because inevitably an oxide film is present. A readily removable oxide film may be removed by causing the sealing material to flow over the sealing region. For a soft metal sealing material, such as indium, such a flow can be caused by the application of pressure thereto at ambient temperatures. However, indium has a low melting point. The removal of oxide films which are more difficult to remove usually has required the application of pressure to the sealing material when the material is at an elevated temperature, and is in an inert atmosphere, or a high vacuum. Thus, it has been required that complex apparatus, and a complex process, have been provided in order to form a satisfactory bond when oxide films which are difficult to remove inevitably have been present on the sealing material.

It is known to provide seals between articles by employing aluminum as the sealing material. However, inevitably, an oxide film is present on the aluminum, and such an oxide film is difficult to remove. Thus, the required bond has been provided by applying pressure to the aluminum, while the aluminum is at a temperature near its melting point of 660° C., and while within an inert atmosphere, or a high vacuum.

It is an object of the present invention to provide a bond between two ceramic articles, or between a ceramic article and a metal article, employing a sealing material having aluminum at least as a major constituent thereof, and avoiding the need to applying a pressure to the sealing material in order to obtain a satisfactory bond.

According to one aspect of the present invention a method of providing a seal between two ceramic articles, or between a ceramic article and a metal article, comprises forming a composite sealing member from a body having aluminum at least as a major constituent thereof, the body being provided with a surface film of zinc or tin, with the inevitable aluminum oxide surface film removed, and then being coated with silver and/or gold, or a suitable alloy containing silver or gold, to complete the composite sealing member, the sealing member then being assembled between the articles to be bonded together, and the assembly being heated to melt the composite sealing member, either in an inert atmosphere, or in a high vacuum, the required seal being obtained when the assembly is subsequently cooled.

According to another aspect the present invention comprises a bonded assembly when provided by a method as referred to above, without the application of pressure during the bonding operation.

The body constituent of the composite sealing member may comprise aluminum, or an aluminum alloy, but it is required that the sealing member melts during the bonding operation, and aluminum is in contact with the article surfaces to be bonded together, enabling a satisfactory bond to be provided between the articles, the aluminum reacting with the article surfaces to form such a bond.

Inevitably an oxide film is formed on the exposed surface of silver before the bonding operation. However, such an oxide film readily decomposes at a temperature of, at most, 250° C., and the oxygen produced thereby is easily removed from the bonding region during the bonding operation. No oxide film is formed on gold before the bonding operation. The zinc or tin film, and the coating of silver and/or gold, or of suitable alloy containing silver or gold, of the composite sealing member, are absorbed readily into the molten aluminum, or aluminum alloy, formed during the bonding operation, but do not prevent aluminum being in contact with the article surfaces to be bonded together. It is desirable that the zinc or tin film, and the coating, are as thin as may be obtained in a practical manner, and commensurate with it being ensured that the aluminum does not become exposed under normally expected storage conditions, before the composite sealing member is used.

Because the sealing member melts during the bonding operation, the consequent flow of the sealing material over the article surfaces in the bonding region further ensures that no oxide film is present in the bonding region.

In this manner a satisfactory bond is obtained; and the assembly so provided subsequently can be out-gassed by being baked in vacuo at a temperature up to 600° C. for several hours.

It is required that the articles to be bonded together can withstand a temperature of the melting point of the composite sealing member, of approximately 660° C.

Zinc or tin is deposited upon the body, and simultaneously the aluminum oxide film is removed, by immersing the body in the appropriate solution.

Such a bonding process is advantageously simple, and does not require complex apparatus.

It is required, in the bonded assembly so obtained, that the thickness of the seal between the articles bonded together is sufficient to accommodate any normally encountered differential thermal expansion between the articles, and between the articles and the seal, especially such differential thermal expansion encountered during the bonding operation.

The present invention will now be described by way of example with reference to the following Examples

EXAMPLE 1

An article of a glass ceramic, having a low coefficient of linear expansion of $0.03 \times 10^{-6}$ per degree Kelvin at 20° C., is assembled with another article of glass ceramic, and with a composite sealing member therebetween. The sealing member comprises an annular shaped wire to be positioned between the articles in a region where the articles are required to be bonded together. The composite sealing member includes a body in the form of a wire of aluminum 1 millimeter in diameter. The aluminum wire is degreased. The inevitable surface film of aluminum oxide is removed, and, simultaneously therewith, there is deposited a film of zinc, 1 micron thick, on the aluminum wire, by immersing the wire in sodium zincate solution. Subsequently, the wire is electroplated with silver, the silver coating so obtained being 2.5 microns thick, and completes the formation of the required composite sealing member. The electroplating step, to deposit silver, is performed before an oxide film can form on the zinc.

The assembly of the two glass ceramic articles with the sealing member therebetween, is placed in a vacuum furnace, with an atmosphere of less than $1 \times 10^{-2}$ newtons per square meter pressure. The furnace is heated at a temperature of approximately 660° C., just above the melting point of the composite sealing member, for 15 minutes, and is allowed to cool to 200° C., before being gas cooled to 100° C., and fast cooled from 100° C. to room temperature.

During the heating process step, any oxide film on the silver coating of the sealing member is decomposed at a temperature of not more than 250° C., and the oxygen produced thereby is readily removed from the bonding region. The zinc and silver of the sealing member are absorbed readily into the molten aluminum, but not preventing aluminum being in contact with the article surfaces to be bonded together. The molten aluminum reacts with the surfaces of the glass ceramic articles, providing a satisfactory bond therebetween when the assembly is cooled.

The assembly is then out-gassed by being heated at a temperature up to 600° C., in vacuo.

EXAMPLE 2

Example 1 is repeated, except that one of the glass ceramic articles is replaced by an article of a nickel-iron alloy, having a composition of 36% by weight of nickel, 64% by weight of iron, together with incidental impurities. The article of the nickel-iron alloy has its bonding surface coated with silver. The alloy has a low coefficient of linear expansion of less than $1 \times 10^{-6}$ per degree Kelvin at 20° C. Molten aluminum wets the surface of the nickel-iron alloy article. A satisfactory seal is provided between the two articles.

One, or both, of the articles may be of fused silica, having a coefficient of linear expansion of $0.4 \times 10^{-6}$ per degree Kelvin at 20° C.

Instead of employing a high vacuum, the bonding operation may be performed in an inert atmosphere.

The body of the composite sealing member may be of an aluminum alloy, instead of aluminum. A suitable alloy comprises 95% by weight aluminum and 5% by weight silicon.

When the body has been degreased, it may be provided with a film of tin, instead of a film of zinc. The inevitable surface film of aluminum oxide is removed, and, simultaneously therewith, there is deposited a film of tin on the aluminum wire, by immersing the wire in sodium stanate solution. Subsequently, the wire is electroplated with silver. Tin is usually coated with a film of oxide, and this may be avoided by the silver coating being provided on the freshly deposited tin.

The silver coating may be provided in any convenient way, instead of being deposited by electroplating.

The silver coating employed in any of the processes, or modifications thereof, described above, may be replaced by a gold coating which does not readily oxidise, or by a coating of a silver-gold alloy, or of a suitable alloy of silver or gold.

I claim:

1. A method of providing a seal between two ceramic articles, or between a ceramic and a metal article, comprising forming a composite sealing member from a body having aluminum, at least, as a major constituent thereof; providing the body with a surface film of a metal selected from the group consisting of zinc and tin and removing any aluminum oxide surface film therefrom and then coating the surface film with a material selected from the group consisting of silver, gold, an alloy of silver and gold, a suitable alloy containing silver, and a suitable alloy containing gold, to complete the composite sealing member, and then assembling the sealing member between the articles to be bonded together and heating the assembly to melt the composite sealing member, either in an inert atmosphere, or in a high vacuum, and then cooling the assembly to obtain the required seal.

2. A method, as claimed in claim 1, in which the ceramic article is of a material selected from a group consisting of glass ceramics and fused silica.

3. A method, as claimed in claim 1, in which the metal article is of an iron-nickel alloy.

4. A method, as claimed in claim 1, in which the bonded assembly is out-gassed by being heated to a maximum temperature of 600° C.

* * * * *

UNITED STATES PATENT AND TRADEMARK OFFICE
CERTIFICATE OF CORRECTION

PATENT NO. : 4,946,090

DATED : August 7, 1990

INVENTOR(S) : William D. Hepburn

It is certified that error appears in the above-identified patent and that said Letters Patent is hereby corrected as shown below:

On the face of the patent under the "Abstract" at line 4, delete "threon" and substitute therefor -- thereon --.

Signed and Sealed this

Third Day of September, 1991

Attest:

HARRY F. MANBECK, JR.

Attesting Officer

Commissioner of Patents and Trademarks